Patented Oct. 14, 1947

2,428,978

UNITED STATES PATENT OFFICE 2,428,978

BASIC DERIVATIVES OF α-SUBSTITUTED ARYLOXY ACETIC ACIDS AND A PROCESS FOR THEIR MANUFACTURE

Henry Martin and Franz Häfliger, Basel, Switzerland, assignors to J. R. Geigy A. G., Basel, Switzerland, a Swiss firm No Drawing. Application July 28, 1944, Serial No. 547,100. In Switzerland July 30, 1943

5 Claims. (Cl. 260—473)

Basic esters and amides of aryloxy acetic acids which are useful for therapeutical purposes have not yet become known heretofore. On examination of basic esters of phenoxy acetic acid, of diphenoxy acetic acid and of phenoxy isobutyric acid with regard to their spasmolytic efficacy there has been observed no spasmolytic effect (cf. B. N. Halpern, Arch. intern. Pharmacodynamie, 59, 188 (1938)).

In contradistinction thereto we have now surprisingly found that basic esters and amides of α-substituted aryloxy acetic acids of the general formula

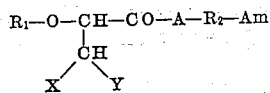

wherein $R_1$ stands for an aromatic radical of the benzene or naphthalene series, and, more particularly, a phenyl, alkylphenyl, alkoxyphenyl, diphenyl, phenoxyphenyl or chlorophenyl radical, X stands for a lower alkyl group, cycloalkyl group, or an aromatic radical of the benzene series, more particularly, a phenyl or tolyl radical, Y stands for hydrogen or a lower alkyl group, X and Y stand jointly for a tetramethylene or pentamethylene group, A stands for —O—, in the case of the esters, and for —NH— or a —N-lower-alkyl group, in the case of the amides, $R_2$ stands for a low molecular alkylene group, and $Am$ means the radical of a secondary amine, more particularly, a dialkylamine, piperidine or morpholine, possess valuable therapeutical properties. These products are distinguished by a good spasmolytical efficacy and possess musculotropic, papaverine-like effects as well as a neurotropic activity of the kind of atropine. In connexion therewith there may be pointed out that the new products show not at all or only in a small extent the mostly undesired by-effects of atropine. Furthermore, many of the new compounds show a manifest analgetic efficacy.

The manufacture of the claimed esters can be carried out according to different methods. For example, reactive derivatives of the above defined aryloxy acetic acids, such as their halides, esters or anhydrides are interacted with N-disubstituted amino alcohols in the presence or absence of condensation agents; another method consists in that reactive esters of the amino alcohols, especially hydrogen halide esters, aryl sulfonic acid esters and the like, are caused to react, if necessary in the presence of acid binding agents, with the said acids or their salts respectively.

Moreover, it is also possible to convert the carboxylic acids in the usual manner into their halogen alkyl esters and to cause the latter to react with secondary amines.

For the preparation of the basic amides the said acids or their functional derivatives are for instance interacted with alkylene diamines containing a primary or secondary amino group as well as a tertiary amino group. A further method consists in that salts, especially alkali salts of corresponding carboxylic acid amides, are caused to react with reactive esters of amino alcohols. The basic amides can also be obtained by first preparing the halogen alkyl amides of the carboxylic acids in question and reaction of the latter with secondary amines.

The basic esters and amides may, furthermore, also be obtained in the following way:

Compounds of the general formula

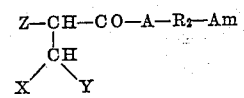

wherein Z means a reactive atom or an exchangeable atom grouping, $Am$, A, $R_2$, X and Y having the above meanings, are interacted with compounds of the general formula

wherein $R_1$ has again the above meaning, or with their salts, if desired in the presence of acid binding agents. As reactive atoms or atom groupings, there may be enumerated: halogen, alkoxy, benzyloxy, sulfonic acid ester groups and so on.

The α-substituted aryloxy acetic acids are partly known; in any event, they may be obtained according to the methods described in the literature.

The basic esters and amides in form of their salts with inorganic or organic acids, are water-soluble and give neutral aqueous solutions. The quaternary compounds of the esters and amides can be obtained in the usual way.

The claims of the present application are directed exclusively to the aforediscussed esters, which, when $R_1$ is phenyl or substituted phenyl as above indicated, constitute the presently-preferred species of the invention.

The present invention will now be illustrated, but not limited by the following examples, the parts being by weight unless otherwise stated.

EXAMPLE 1

21.2 parts of α-phenoxy isovaleric acid chloride are dissolved in 250 parts by volume of absolute ether and cooled below 0° C. While continuously cooling and stirring, a solution of 13 parts of diethyl amino ethanol in 50 parts by volume of absolute ether is dropped thereinto. Then the whole mixture is stirred for 1 hour at room temperature and the reaction mixture is shaken twice with water and once with diluted hydrochloric acid. The combined aqueous solutions are made alkaline to phenolphthaleine and the base thus separated is extracted with ether. The ethereal solution is washed with water, dried over potassium carbonate and the solvent is distilled off. The obtained α-phenoxy isovaleric acid diethyl amino ethanol ester of the formula

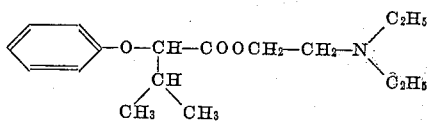

boils at 128°–130° C. at 0.1 mm. pressure.

If instead of the α-phenoxy isovaleric acid chloride, in the above example other aryloxy acetic acid chlorides are used, the following basic esters are obtained:

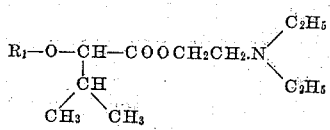

Table 1

| No. | R₁ | B. P. °C. | mm. |
|---|---|---|---|
| 1 | (phenyl, o-CH₃) | 130–132 | 0.15 |
| 2 | (phenyl, m-CH₃) | 115–118 | 0.05 |
| 3 | (CH₃-phenyl, p-) | 130–132 | 0.15 |
| 4 | (2,4-dimethylphenyl) | 128–130 | 0.07 |
| 5 | (2,5-dimethylphenyl) | 124–126 | 0.05 |
| 6 | (2,6-dimethylphenyl) | 132–134 | 0.05 |
| 7 | (isopropylphenyl) | 128–130 | 0.08 |
| 8 | (biphenyl) | 188–190 | 0.15 |

Table 1—Continued

| No. | R₁ | B. P. °C. | mm. |
|---|---|---|---|
| 9 | (methylnaphthyl) | 173–175 | 0.15 |
| 10 | (naphthyl) | 168–170 | 0.03 |

EXAMPLE 2

22.8 parts of α-(m-chlorophenoxy)-isovaleric acid are dissolved in 250 parts by volume of dry acetic ester, then heated with 15 parts of β-chloroethyl diethyl amine and 15 parts of potassium carbonate and the whole is stirred for 24 hours at its boiling temperature. After cooling the inorganic residue is filtered off and washed with acetic ester, whereupon the combined filtrates are repeatedly extracted with diluted hydrochloric acid. The acid aqueous solution is extracted with ether, then made alkaline to phenolphthaleine and the base thus separated is again extracted with ether. After drying over potassium carbonate the ether is distilled off. By a further distillation of the residue α-(m-chlorophenoxy)-isovaleric acid diethyl amino ethanol ester of the formula

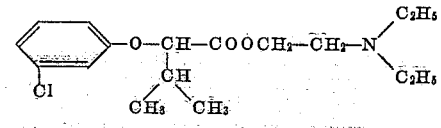

is obtained; this product boils at 0.07 mm. pressure at 134°–136° C.

In the same manner the following compounds may be obtained:

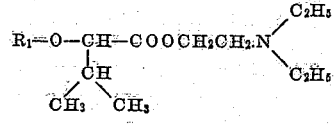

Table 2

| No. | R₁ | B. P. °C. | mm. |
|---|---|---|---|
| 1 | (OCH₃-phenyl) | 135–137 | 0.1 |
| 2 | (OCH₃-phenyl) | 138–140 | 0.05 |
| 3 | CH₃O-phenyl | 130–132 | 0.07 |
| 4 | (OC₂H₅-phenyl) | 142–146 | 0.05 |
| 5 | (OC₂H₅-phenyl) | 140–143 | 0.05 |
| 6 | C₂H₅O-phenyl | 149–151 | 0.03 |

Table 2—Continued

| No. | R₁ | B.P. °C. | mm. |
|---|---|---|---|
| 7 | (phenyl)-OCH(CH₃)-CH₃ | 138-140 | 0.05 |
| 8 | (phenyl with OCH₃, OCH₃) | 158-160 | 0.1 |
| 9 | (phenyl)-O-(phenyl) | 178-180 | 0.07 |

EXAMPLE 3

8 parts of glycol chlorohydrine are dissolved in 100 parts of dry pyridine. Then, while stirring, 23 parts of α-(o-cresoxy)-isovaleric acid chloride are dropped into this solution, the reaction temperature being maintained below 0° C. Now, the whole is poured onto ice, made acid to Congo red and extracted with ether. After washing, drying and distillation of the ether the α-(o-cresoxy)-isovaleric acid-β-chloroethyl ester, B. P. 105°-110° C. at 0.1 mm. pressure, is obtained.

13.5 parts of this compound are treated in 100 parts by volume of absolute toluene with 8 parts of diethyl amine and heated in the autoclave for 6 hours to 100°-120° C. by working up the mixture according to the indications of Example 2 one obtains α-(o-cresoxy)-isovaleric acid diethyl amino ethanolester (see Table 1, compound No. 1).

EXAMPLE 4

25.6 parts of the dry sodium salt of α-(m-cresoxy)-cyclopentyl acetic acid are powdered until a dust-like powder has resulted. The same is then suspended in 200 parts by volume of absolute benzene. After addition of 15 parts of β-chloro-ethyl diethyl amine the mixture is heated to boiling for 12 hours, the mixture being stirred during this operation. The new base of of the formula

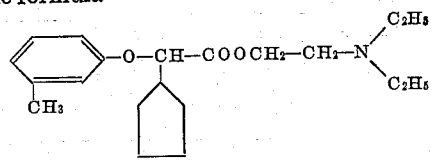

is worked up as described in Example 2. It possesses the boiling point of 136°-138° C. at 0.08 mm. pressure.

According to the same methods the following compounds can be produced:

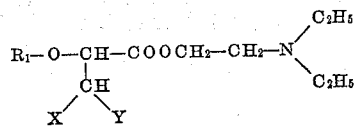

Table 3

| No. | R₁ | X | Y | B.P. °C. | mm. |
|---|---|---|---|---|---|
| 1 | phenyl | —C₂H₅ | H | 130-132 | 0.03 |
| 2 | phenyl | —C₂H₅ | CH₃ | 133-135 | 0.1 |
| 3 | phenyl | C₂H₅— | C₂H₅— | 138-140 | 0.08 |
| 4 | phenyl | C₂H₅— | n—C₃H₇ | 143-145 | 0.1 |
| 5 | phenyl | —CH(CH₃)CH₃ | H | 132-135 | 0.05 |
| 6 | phenyl | —CH₂—CH₂— | —CH₂—CH₂— | 142-144 | 0.12 |
| 7 | phenyl-CH₃ | —CH₂—CH₂— | —CH₂—CH₂— | 138-140 | 0.05 |
| 8 | phenyl | —CH₂—CH₂—CH₂— | —CH₂—CH₂— | 142-144 | 0.08 |
| 9 | phenyl | phenyl | H | 150-152 | 0.03 |
| 10 | phenyl | cyclopentyl | H | 146-148 | 0.05 |

Table 3—Continued

| No. | R₁ | X | Y | B. P. °C. | mm. |
|---|---|---|---|---|---|
| 11 | phenyl | tolyl (o-CH₃) | H | 165–168 | 0.1 |
| 12 | phenyl | o-CH₃ phenyl | H | 171–173 | 0.09 |
| 13 | phenyl | p-CH₃ phenyl | H | 172–174 | 0.06 |

EXAMPLE 5

When starting from 23 parts of α-(m-cresoxy)-isovaleric acid chloride and 10 parts of dimethyl amino ethanol there is obtained, according to Example 1, the α-(m-cresoxy)-isovaleric acid dimethyl amino ethanol ester of the formula

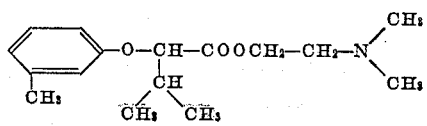

B. P. 118°–120° C. at 0.1 mm. pressure.

If, instead of dimethyl amino ethanol, other amino alcohols or acid chlorides are used in the above example, the following compounds will be obtained

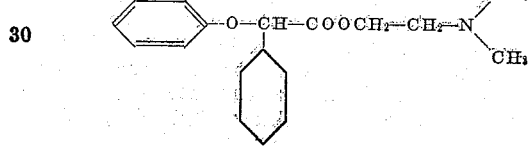

B. P. 155°–156° C. at 0.3 mm. pressure.

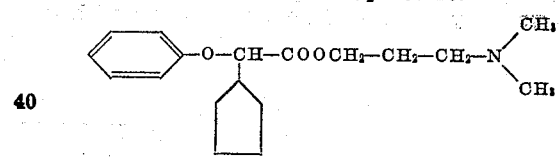

B. P. 136°–138° C. at 0.2 mm. pressure.

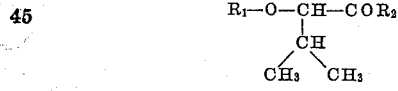

Table 4

| No. | R₁ | R₂ | B. P. °C. | mm. |
|---|---|---|---|---|
| 1 | CH₃-phenyl | —O—CH₂—CH₂—N(piperidino) | 144–146 | 0.1 |
| 2 | CH₃-phenyl | —OCH₂—CH₂—N(piperidino) | 139–140 | 0.15 |
| 3 | CH₃-phenyl | —O—CH₂—CH₂—N(morpholino) | 165–168 | 0.35 |
| 4 | CH₃-phenyl | —O—CH₂—CH₂—CH₂—N(C₂H₅)₂ | 130–132 | 0.05 |
| 5 | CH₃-phenyl | —OCH₂—CH₂—CH₂—N(C₂H₅)₂ | 131–133 | 0.15 |
| 6 | CH₃-phenyl | —O—CH₂—C(CH₃)₂—CH₂—N(C₂H₅)₂ | 138–140 | 0.1 |

Table 4—Continued

| No. | R₁ | R₂ | B.P. °C. | mm. |
|---|---|---|---|---|
| 7 | (methylphenyl) | –O–CH₂–CH₂–CH₂–N(piperidino) | 148–150 | 0.08 |
| 8 | (methylphenyl) | –OCH₂–CH₂–CH₂–N(piperidino) | 145–146 | 0.15 |
| 9 | (methylphenyl) | –OCH₂–CH₂–CH₂–N(CH₃)₂ | 119–120 | 0.18 |

EXAMPLE 6

21.2 parts of α-phenoxy valeric acid chloride are interacted according to the indications made in Example 1, with 13 parts of N:N-diethyl ethylene diamine, thus giving, after a usual working up, the base of the following formula

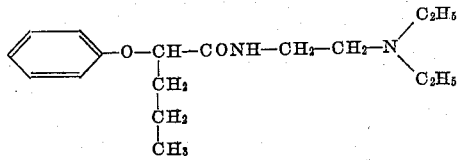

B. P. 150°–153° C., at 0.03 mm. pressure.

In the same manner the following compounds may also be obtained:

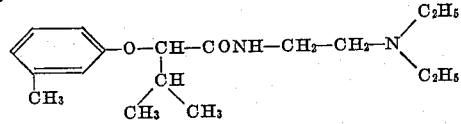

B. P. 148°–150° C., at 0.1 mm. pressure.

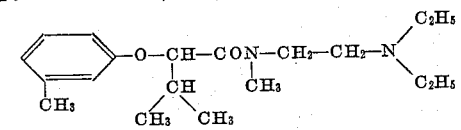

B. P. 138°–140° C. at 0.1 mm. pressure.

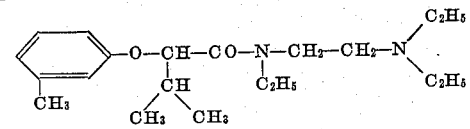

B. P. 140°–142° C. at 0.1 mm. pressure.

EXAMPLE 7

19.3 parts of α-phenoxy isovaleric acid amide and 4 parts of finely powdered sodium amide are heated to boiling for 4 hours in 200 parts by volume of absolute toluene. Then 15 parts of β-chloroethyl diethyl amine in 50 parts by volume of absolute toluene are caused to drop into this mixture, which is boiled under stirring for further 4 hours. By working up according to Example 2 the new base of the formula

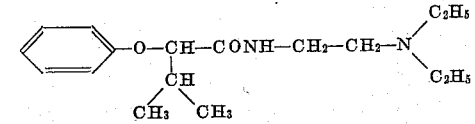

B. P. 150°–152° C. at 0.1 mm. pressure, is isolated.

EXAMPLE 8

81 parts of dry guaiacol potassium salt are suspended in 500 parts by volume of xylene, then 140 parts of α-bromo isovaleric acid diethyl amino ethanol ester (B. P. 95°–100° C. at 0.4 mm. pressure) are added and the whole is heated to boiling for 4 hours under stirring. After cooling the residue is filtered by suction, washed with xylene and the xylene is distilled in vacuo. The residue is dissolved in diluted hydrochloric acid, extracted with ether and, the new base separated by means of a sodium carbonate solution. The base is extracted with ether, washed and dried over potassium carbonate. After distilling off the ether there will be obtained in a good yield, by further distillation, the α-(o-methoxyphenoxy)-isovaleric acid diethyl amino ethanol ester of the formula

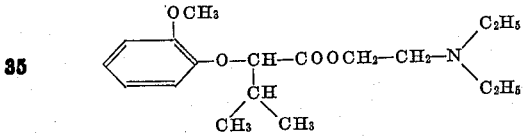

B. P. 135°–137° C. at 0.1 mm. pressure.

Instead of the bromo compound used in the above example, the analogous chloro compound or another ester-like compound, such as the toluene sulfonic acid ester, may be used; moreover, also ether-like compounds, such as the analogous methoxy or benzyloxy compounds, are suitable.

What we claim is:

1. A basic derivative of an α-substituted aryloxy acetic acid of the formula $$R-O-CH(Z)-CO-O-(CH_2)_n-Am$$

wherein R represents a member selected from the group consisting of phenyl, methylphenyl and methoxyphenyl, Z represents a member selected from the group consisting of

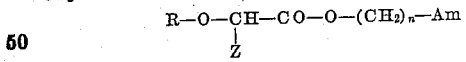

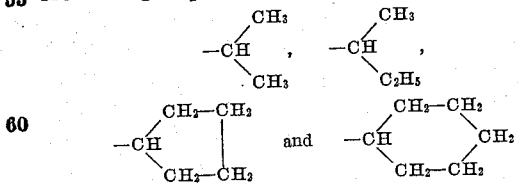

Am represents a radical selected from the group consisting of dialkylamino, piperidino and morpholino radicals, and n means one of the integers 2 and 3, being a colorless liquid of valuable therapeutical properties.

2. A basic ester of an α-substituted aryloxy acetic acid of the formula

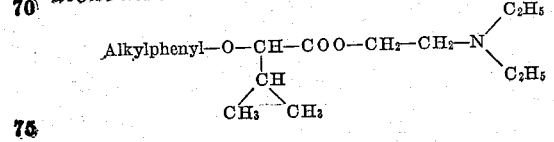

3. The basic ester of a α-substituted aryloxy acetic acid of the formula

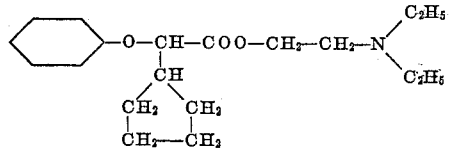

being a colorless liquid of valuable therapeutical properties.

4. The basic ester of an α-substituted aryloxy acetic acid of the formula

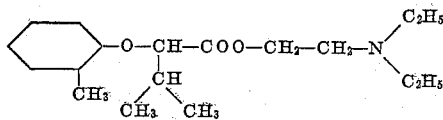

being a colorless liquid of valuable therapeutical properties.

5. The basic ester of an α-substituted aryloxy acetic acid of the formula

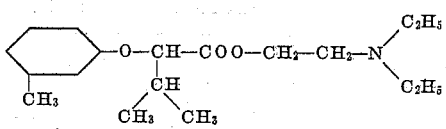

being a colorless liquid of valuable therapeutical properties.

HENRY MARTIN.
FRANZ HÄFLIGER.

REFERENCES CITED

The following references are of record in the file of this patent:

UNITED STATES PATENTS

| Number | Name | Date |
| --- | --- | --- |
| 2,010,731 | Lubbert et al. | Aug. 6, 1935 |
| 1,987,546 | Blankart | Jan. 8, 1935 |

OTHER REFERENCES

Halpern, "Arch. intern. Pharmaco-dynamie," vol. 59, pp. 150–151, 156, 188 (1938).

Plazek et al., "Chemical Abstracts," vol. 30 (1936), p. 1371.